April 6, 1943.　　　D. C. FUTRELL　　　2,316,145
NIPPLE STERILIZER
Filed Sept. 23, 1941
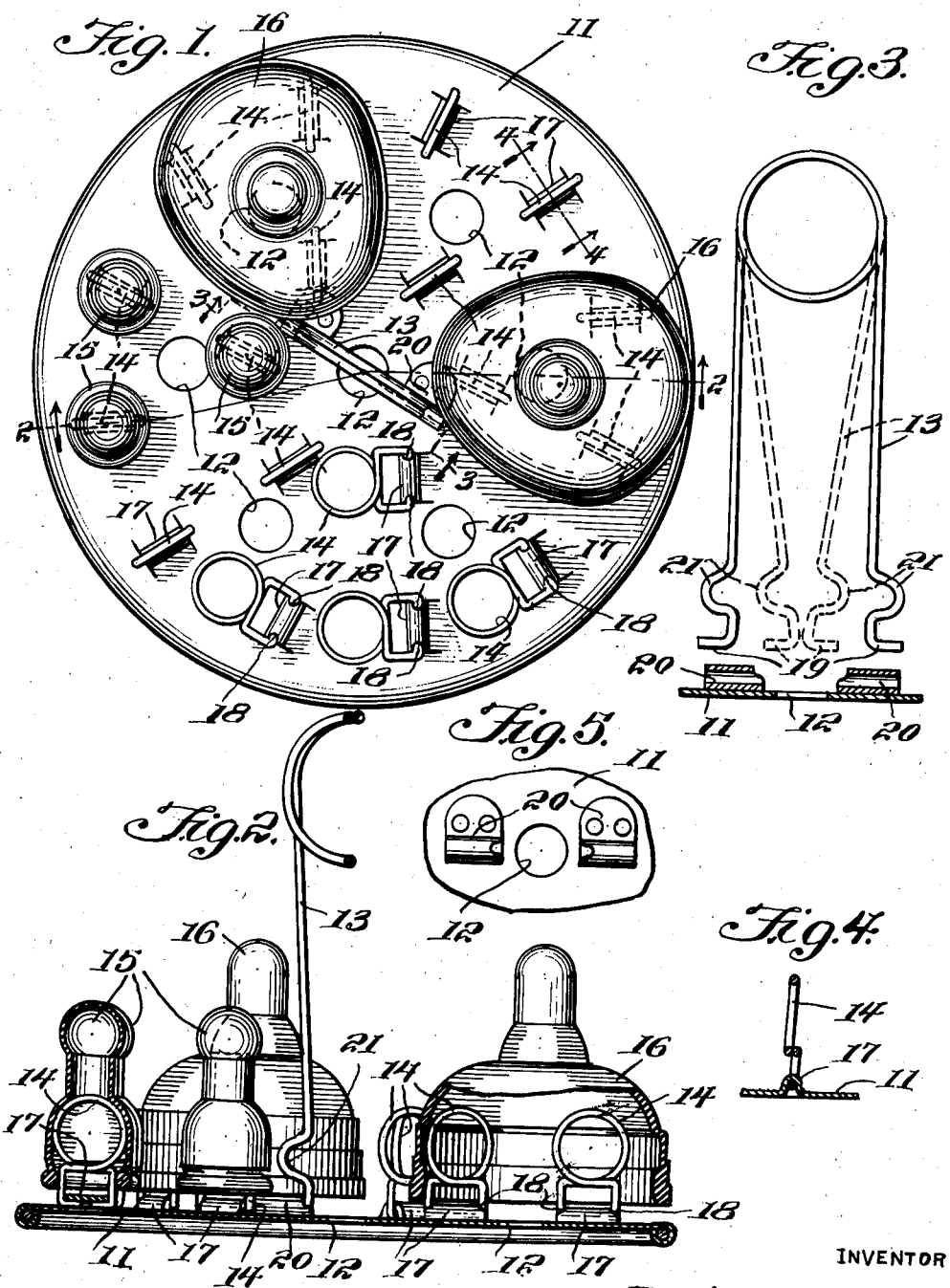
INVENTOR
David C. Futrell
BY Emery, Holcombe & Miller
HIS ATTORNEYS Patented Apr. 6, 1943

2,316,145

UNITED STATES PATENT OFFICE 2,316,145

NIPPLE STERILIZER

David C. Futrell, North Little Rock, Ark.

Application September 23, 1941, Serial No. 412,019

9 Claims. (Cl. 21—105)

My invention relates to implements for sterilizing nipples used for feeding babies from bottles, and aims to provide a simple, inexpensive, convenient device for this purpose.

Apparatus for sterilizing both nipples and bottles is cumbersome and relatively expensive, so that its field of use is restricted to hospitals, institutions, and families of means, and one of the objects of my invention is to provide a satisfactory nipple holding rack suitable for use as a sterilizer in the average family.

Further objects of my invention are to provide for sterilizing both small neck and large neck nipples and nursing bottle caps, and holding them in suitable position for draining dry, and to provide means for manipulating them while hot and without touching them with the hands.

Further objects and advantages of my invention appear in connection with the following description of the illustrative embodiment thereof shown in the accompanying drawing, wherein Figure 1 is a plan view of the device, showing both large and small neck nipples in position for undergoing sterilization; Figure 2 is a transverse cross-section of the same on the line 2—2 in Figure 1, the handle being shown partly in side elevation; Figure 3 is a transverse cross-section of the middle portion thereof on the line 3—3 in Figure 1, showing the combined tongs and handle removed for use as a tongs; Figure 4 is cross-section of a nipple holder portion of the device on the line 4—4 in Figure 1, and Figure 5 is a plan view of the middle portion of the device showing the loops for holding the handle in position, the handle being removed.

The device is intended to be used in connection with a suitable heated vessel containing sufficient boiling water to enable it to be submerged until the nipples are thoroughly sterilized, the vessel, however, being no part of my invention.

In the preferred form of the invention shown in the drawing, the body of the sterilizer consists of a circular plate 11 formed of non-corroding sheet material, preferably aluminum, although wire cloth or moldable plastic material may be used. Preferably this body is formed with spaced openings 12 to enable it to be readily immersed in an open receptacle containing boiling water standing on a gas stove or electric heater, a removable handle 13 preferably made of wire or other resilient material being provided for this purpose.

The nipple holders 14 are made of loops of wire bent to fit within the open necks of the smaller type of nipple 15 adapted for use on narrow neck nursing bottles, and are secured to the body in position to support the nipples upright in symmetrically spaced arrangement, the spacing being such as to provide groups of three supports each so disposed as to support a large nipple of wide mouth type 16 on each group if desired, as shown in Figures 1 and 2.

The ends of the wire forming each nipple holder 14 are bent in laterally to aline with and engage in the open ends of recesses formed by bending up narrow slit portions 17 of the sheet material of which the body is made, as illustrated in Figures 1 and 4, and thus these recesses form hinges in which the nipple holders are pivotally supported permitting them to be turned flat against the body when not in use. These slits are provided with notches 18 in which the holders engage to hold them in an erect position for use. Obviously, sheet metal hinges may be spot-welded to the body to secure the holders 14 in position if desired, similar to the hinge loops for the handle.

The wire handle 13, has outturned ends 19 which may be sprung together (as shown in dotted lines in Figure 3) to permit them to be inserted in recessed hinge loops 20 spaced symmetrically on each side of the principal diameter of the body and spot-welded thereto, as shown in Figure 5, to hold the handle erect in central position when in use. Intermediate portions 21 of the handle are bent to conform to the shape of the neck portion of a nipple, so that the handle when removed from the body and permitted to resume its normal shape, as shown in full lines in Figure 3, constitutes a convenient nipple tongs for removing sterilized nipples from the holders and depositing them in a jar or other container for holding them until they are needed for use without touching them with the hands.

The device may also be used for sterilizing rubber nursing bottle caps, which are made in the same neck sizes as the nipples, and may be held on the holders 14 in the same manner as nipples.

In the illustrative form of the device, the nipple holders are disposed in six groups of three holders each, thereby permitting six large nipples or caps, or eighteen small nipples or caps, or some large and some small nipples or caps, to be sterilized simultaneously; but obviously this arrangement may be modified to suit the conditions of use. The invention is not restricted to the design shown in the drawing, as other forms of rack may be adapted to the purpose.

I claim:

1. A nipple sterilizer for nipples for narrow neck and wide mouth type infants' feeding bottles comprising a support formed from thin flat material and provided with a handle, said support having narrow portions displaced from the plane of the body for receiving the ends of wire nipple holders, nipple holders formed of wire loops having their ends in axial alinement transversely of the principal axis thereof and respectively engaged in said displaced portions of said support, said holders each being adapted to fit within and hold securely nipples of narrow neck type, and said displaced portions being arranged in a plurality of groups of not less than two displaced portions to a group whereby the holders secured thereby are spaced to fit within and hold securely nipples of wide mouth type.

2. A nipple sterilizer for nipples for narrow neck and wide mouth type infants' feeding bottles comprising a support formed from thin flat material and provided with a handle, said support having portions constituting hinges for receiving the ends of wire nipple holders, nipple holders formed of wire loops having their ends in axial alinement transversely of the principal axis thereof and respectively engaged in said hinge portions of said support, said holders each being adapted to fit within and hold securely nipples of narrow neck type, and said hinges being arranged in a plurality of groups of not less than two hinges to a group whereby the holders secured thereby are spaced to fit within and hold securely nipples of wide mouth type.

3. A nipple sterilizer for nipples for narrow neck and wide mouth type infants' feeding bottles comprising a support formed from thin flat material and provided with a removable handle, said support having narrow portions displaced from the plane of the body for receiving the ends of wire nipple holders, nipple holders formed of wire loops having their ends in axial alinement transversely of the principal axis thereof and respectively engaged in said displaced portions of said support, said holders each being adapted to fit within and hold securely nipples of narrow neck type, and said displaced portions being arranged in a plurality of groups of not less than two displaced portions to a group whereby the holders secured thereby are spaced to fit within and hold securely nipples of wide mouth type, and said handle being formed of spring metal shaped to provide tongs for manipulating said nipples when said handle is removed from said support.

4. A nipple sterilizer for nipples for narrow neck and wide mouth type infants' feeding bottles comprising a support formed from thin flat material and provided with a handle, said support having narrow portions displaced from the plane of the body for receiving the ends of wire nipple holders, nipple holders formed of wire loops having their ends in axial alinement transversely of the principal axis thereof and respectively engaged in said displaced portions of said support, said holders each being adapted to fit within and hold securely nipples of narrow neck type, and said displaced portions being arranged in a plurality of groups of three displaced portions to a group whereby the holders secured thereby are spaced to fit within and hold securely nipples of wide mouth type.

5. A nipple sterilizer for nipples for narrow neck and wide mouth type infants' feeding bottles comprising a support formed from thin flat material and provided with a handle, said support having portions constituting hinges for receiving the ends of wire nipple holders, nipple holders formed of wire loops having their ends in axial alinement transversely of the principal axis thereof and respectively engaged in said hinge portions of said support, said holders each being adapted to fit within and hold securely nipples of narrow neck type, and said hinges being arranged in six groups of three hinges to a group whereby the holders secured thereby are spaced to fit within and hold securely nipples of wide mouth type.

6. A nipple sterilizer for nipples for infants' feeding bottles comprising a support of sheet material provided with symmetrically spaced recesses formed therein by displacing portions of the material out of the plane of the remainder, said recesses being adapted to receive the transversely bent ends of loops of wire shaped to receive said nipples on their intermediate portions, respectively, and a centrally disposed recess for receiving the transversely bent ends of a spring wire handle having intermediate portions adapted to embrace a nipple for manipulating the latter when removed from the support, substantially as described.

7. A supporting rack for closures for infants' feeding bottles comprising a body of sheet material, spaced hinges on said body disposed in groups of three, closure holders formed of loops of wire having the ends of their shanks engaged in said hinges, and notches in the ends of said hinges to receive the shanks of said holders to retain them in erect position on said body when in use, said holders being foldable to positions parallel to said body when not in use.

8. A supporting rack for closures for infants' feeding bottles comprising a body of sheet material, spaced hinges on said body disposed in groups, closure holders formed of loops of wire having the ends of their shanks engaged in said hinges, and notches in the ends of said hinges to receive the shanks of said holders to retain them in erect position on said body when in use, said holders being foldable to positions parallel to said body when not in use, and a pair of spaced hinges centrally positioned on said body to receive the ends of the shanks of a loop shape handle of flexible material adapted to be sprung into engagement therein.

9. A supporting rack for closures for infants' feeding bottles comprising a body of sheet material, spaced hinges on said body having open ends, closure holders formed of loops of wire having the ends of their shanks bent transversely and respectively engaged in the open ends of each of said hinges, and notches in the ends of said hinges to receive the shanks of said holders to retain them in erect position when in use, in combination with a pair of spaced hinges disposed in transverse alinement on said body and having their adjacent open ends provided with alined notches to receive the shanks and ends of a handle having flexible wire shanks with outturned ends and adapted to be sprung together to engage therein.

DAVID C. FUTRELL.